United States Patent
Herriott

[11] 3,782,829
[45] Jan. 1, 1974

[54] LENS ALIGNMENT APPARATUS AND METHOD

[75] Inventor: Donald Richard Herriott, Morris Township, Morris County, N.J.

[73] Assignee: Bell Telephone Laboratories, Incorporated, Murray Hill, N.J.

[22] Filed: June 28, 1972

[21] Appl. No.: 266,987

[52] U.S. Cl. .............. 356/127, 356/153, 350/184, 350/175 FS
[51] Int. Cl. .................. G01b 9/00, G01b 11/26
[58] Field of Search .................... 356/138, 109; 350/175 FS, 184

[56] References Cited
UNITED STATES PATENTS
3,470,377  9/1969  Febie et al. .......... 356/138
2,782,684  2/1957  Hopkins .............. 350/184

OTHER PUBLICATIONS
"A Laser...Optical Shop.", 6 Applied Optics 1237

Primary Examiner—David Schonberg
Assistant Examiner—Conrad Clark
Attorney—W. L. Keefauver et al.

[57] ABSTRACT

Apparatus for aligning a lens along an optic axis comprises a source of collimated light, a movable converging lens and a fixed, multi-element, substantially symmetrical lens. The output wavefront projected from the multi-element lens can be varied from convex to planar to concave to match the curvature of the lens being aligned by axially moving the converging lens. By correcting the multi-element lens for aberrations at a magnification $n$ (where $n$ is a number), abberation correction also occurs at magnifications $1/n$ and $-1$. Magnification $n$ is preferably selected to be in the range of about 1.8 to 8 to achieve aberration correction over a wide band of magnifications corresponding to a number of different lens surface curvatures to be aligned with the apparatus.

7 Claims, 2 Drawing Figures

LENS ALIGNMENT APPARATUS AND METHOD

BACKGROUND OF THE INVENTION

This invention relates to methods and apparatus for minimizing the effects of lens aberration, and more particularly, to methods and apparatus for minimizing the effects of lens aberration in lens alignment instruments.

One well-known technique for aligning a lens along an optic axis comprises the steps of projecting light toward the lens along the axis, rotating the lens about the axis, observing light reflected from the lens, and adjusting the lens position until the reflected light is stationary during lens rotation. For most accurate use of the instrument, the wavefront of light projected against the lens should have a curvature corresponding to the lens surface under study.

The lens alignment instrument may typically comprise a source of collimated light, a beam splitter, and a series of interchangeable lenses for producing a wavefront of the desired curvature to match the lens being aligned. Reflected light from the lens is projected back through the instrument to the beam splitter where it is projected through an eyepiece for observation during lens rotation. The lenses of the instrument are typically interchanged to give different magnifications when wavefronts of different curvature are required. Thus, a negative magnification produces a convex wavefront, while a positive magnification is required for producing a concave wavefront.

Changing the lenses of the alignment instrument is of course time-consuming. More importantly, each lens typically displays radically different aberration characteristics at different magnifications; while it may be corrected for aberrations at any single magnification, the lens is not corrected at more than one magnification value. Unavoidable aberrations at other magnification values of course result in inaccuracies when extremely high precision lens alignment is sought. It is therefore usual to reduce the aperture of the lens until the aberrations are not critical. This also reduces the sensitivity and accuracy of centering.

SUMMARY OF THE INVENTION

Accordingly, it is an object of this invention to increase the accuracy with which lenses may be aligned along an axis.

It is another object of this invention to simplify the use of lens alignment instruments.

It is a specific object of this invention to reduce aberrations at various magnifications of a lens alignment instrument.

It is another specific object of this invention to provide a lens alignment instrument for conveniently producing output wavefronts with curvatures, that vary from convex to planar to concave, with accuracy and with a minimum of aberrations.

These and other objects of the invention are attained in an illustrative embodiment comprising an alignment instrument in which collimated light is projected through a movable converging lens and a fixed symmetrical multi-element lens. With the symmetrical lens being corrected for aberrations at some magnification value $n$, I have found that it will simultaneously be corrected for aberrations at magnification values of $1/n$ and $-1$, where $n$ is any number, but is preferably between 1.8 and 8. For example, if the fixed lens is corrected for aberrations at a magnification value of 2 ($n = 2$) it will be automatically corrected for aberrations at magnifications of 0.5 ($1/n$) and $-1$.

Thus, over the range of magnifications of $-2$ to $+2$, which gives a range of wavefronts varying from concave to planar to convex, one gets three points of aberration correction. The various magnification values may conveniently be achieved, and the various wavefronts generated, by merely moving the converging lens along the optic axis. With three points of aberration correction along the band of values used, one can further refine lens design to give a small tolerable aberration level for all magnification values that will be used for aligning lenses having a wide range of concave, planar or convex surfaces.

These and other objects, features and advantages of the invention will be better understood from a consideration of the following detailed description taken in conjunction with the accompanying drawing.

DRAWING DESCRIPTION

DETAILED DESCRIPTION

Figure 1:
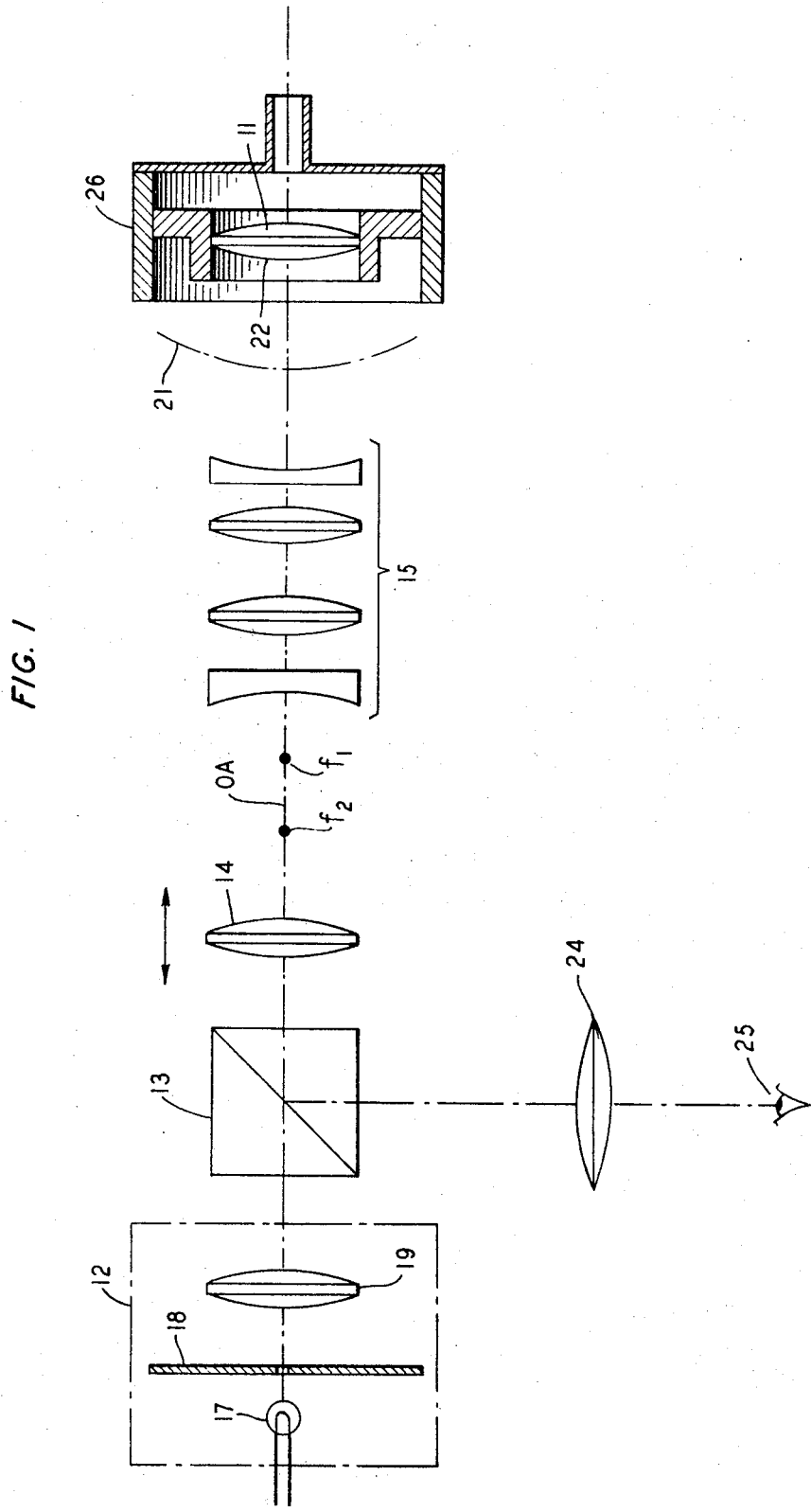
FIG. 1 is a schematic view of a lens alignment instrument in accordance with an illustrative embodiment of the invention.

Referring now to FIG. 1 there is shown an instrument for aligning a lens 11 along an optic axis OA comprising a collimated light source 12, a beam splitter 13, a movable converging lens 14 and a fixed multi-element symmetrical lens 15. The collimated light source may typically comprise a light source 17, a pinhole aperture 18 and a converging lens 19 for projecting rays substantially parallel to the optic axis OA. The purpose of the converging lens 14 and the fixed symmetrical lens 15 is to convert the collimated light from source 12 to light having wavefronts 21 with a curvature corresponding to the curvature 22 of the lens being aligned.

As is known, part of the light projected against surface 22 is reflected back along OA through lenses 15 and 14 to the beam splitter 13. Light reflected from surface 22 has approximately the radius shown by wavefront 21 which, when projected from right to left, is collimated by lenses 15 and 14. This substantially collimated light is imaged by eyepiece 24 for observation by observer 25.

The lens 11 is mounted in a lens holder 26 which may be rotated about the desired optic axis OA during observation. During rotation, light reflected back will be stationary only if surface 22 is aligned on the optic axis. Thus, the position of lens 11 is adjusted during rotation and observation to align it on the optic axis. After the lens has been properly aligned so that it consistently reflects light along the optic axis, its position is fixed in a permanent mount, or the lens edge is permanently ground, as is known in the art.

When different lenses are aligned, it is important that the elements of the alignment instrument be adjusted to give an output wavefront 21 that matches the curvature of the lens surface under study. As a practical matter, wavefront 21 should be capable of being varied from convex to planar to concave, which, in conventional apparatus may be accomplished by focusing over a narrow range or by interchanging component lenses of the alignment instrument. In accordance with the present invention, this function is accomplished simply by axially moving the movable lens 14 as illustrated by the arrow.

More particularly, if the converging movable lens 14 images light from source 12 to a point inside the focus of fixed lens 15, the wavefront produced will be convex, whereas if it focuses light to a point outside of focus of lens 15, the wavefront produced will be concave as shown. Assume, for example, $f_1$ is the focal point of lens 15 and $f_2$ is the focal point of lens 14. As shown, $f_2$ is outside of focus of lens 15 and therefore the wavefront 21 is concave. If lens 14 is moved such that $f_2$ is coincident with $f_1$, the output wavefront will be planar, and if lens 14 is moved to locate $f_2$ to the right of $f_1$, then the output wavefront will be convex. Thus, it can be appreciated that by moving lens 14 axially, one can match the output wavefront to the curvature of any of a number of concave or convex lens surfaces to be aligned. In effect, the magnification of lens 15 changes as the position of lens 14 changes: when $f_2$ is to the right of $f_1$, lens 15 gives a negative magnification; when $f_1$ and $f_2$ are coincident the magnification is infinity; and then $f_2$ is to the left of $f_1$, the magnification is positive.

A serious problem of conventional lens alignment instruments is that the lens used in the instrument can be corrected for aberrations at only one magnification. A typical example of path length variations of prior art instruments is shown by curves 28 of FIG. 2 which are curves of the variation of optical path length with the short conjugate numerical aperture at various values of magnification. The typical prior art device is corrected for aberrations at a magnification of infinity ($\infty$); thus, the optical path length at that corrected value changes very little with aperture. However, as the other curves 28 illustrate, serious variations of optical path occur at other magnifications, which indicates uncorrected aberrations at these values.

Curves 29 on the other hand, which refer to multi-element lens 15 of FIG. 1, show relatively small variations of optical path with aperture over a range of magnifications of 0.5 to $\infty$ to −2.0. This indicates that convex, planar and concave wavefronts can be formed with accuracy, due to limited aberrations over this range.

In accordance with the invention, it is important that lens 15 be a multi-element lens and that it be substantially symmetrical. By "symmetrical" one means that the effect of the lens on light projected in one direction on the optic axis will be substantially the same as its effect on light projected along the opposite axial direction. Under these conditions I have found that if lens 15 is corrected for aberrations at magnification $n$, it will be automatically corrected for aberrations at magnifications $1/n$ and at −1, where $n$ is a number. At the −1 magnification, the source is imaged at the center of the lens. Each ray is therefore deviated in the first half of the lens by essentially the same magnitude and opposite direction as that in the second half, thus giving aberration cancellation. When $n$ is chosen to be in the range of about 1.8 to 8, the lens can be corrected so as to project concave, planar and convex wave fronts over a wide range of radii with minimal aberrations.

Figure 2:
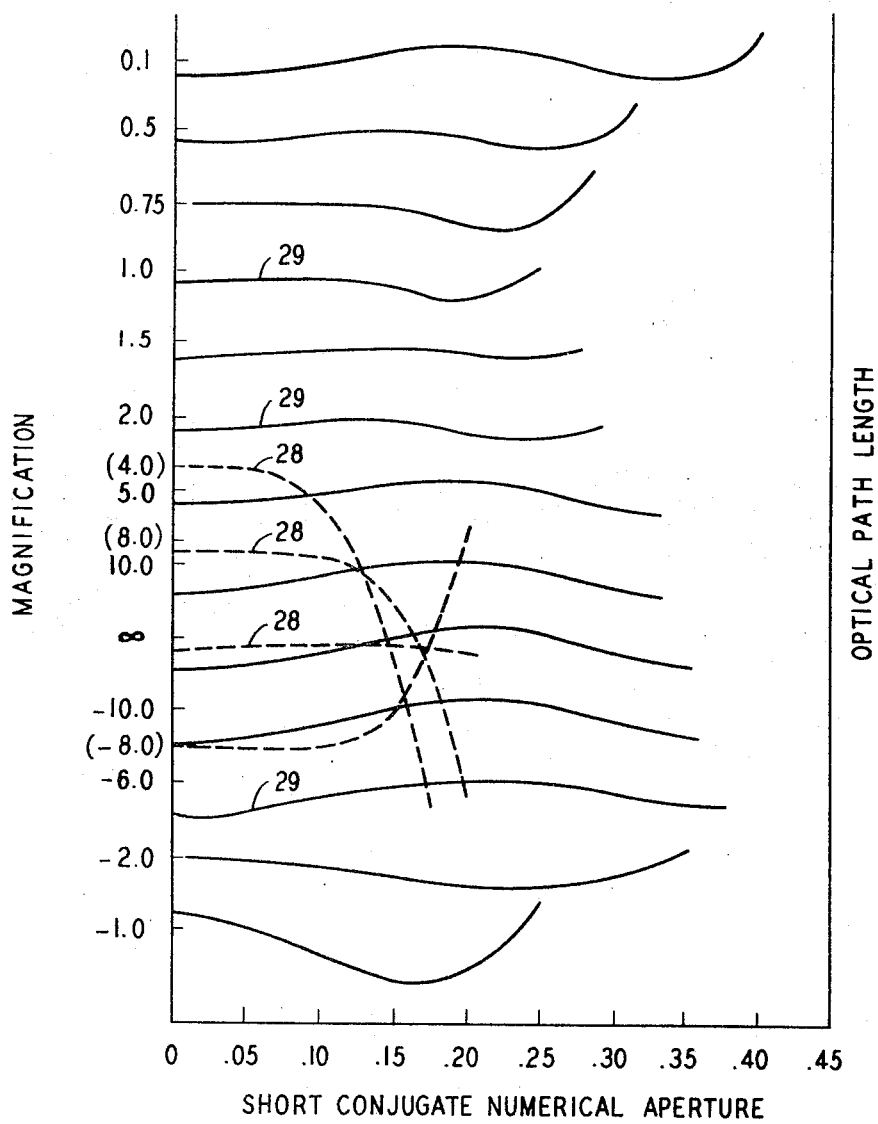
FIG. 2 is a series of graphs of optical path length versus the short conjugate numerical aperture at various magnification values of the multi-element lens of FIG. 1, and of a comparable lens of the prior art.

For example, if $n$ is chosen to be 2, and lens 15 is corrected for aberrations at a magnification of 2, then it will be corrected for aberrations at magnifications of 0.5 ($1/n$) and −1. As illustrated in FIG. 2 these three points of corrected aberration define a fairly wide range of magnifications; viz., from 0.5 to $\infty$ (the planar wavefront case) to −1.0. Theoretically, with the lens corrected at $n = 2$, the curve 29 at magnification 2.0 should be substantially straight as would be the curves at magnifications 0.5 and −1.0. In practice, it is preferred that, after the initial aberration correction, further correction be made to give reasonably flat curves (with minimal aberrations) over the range of magnifications that are most likely to be used. Thus, curves 29 show relatively aberration-free magnifications for virtually all values between 0.5, $\infty$ and −1.0, at the expense of a certain amount of added aberration, particularly at the magnification −1.0, which is the value at the negative extreme of the range being used. This makes possible the generation of wavefronts having curvatures that vary from an $f/1.9 - 1.2$ inches concave radius, through the plano case to an $f/1.2 - 0.5$ inches convex radius. Instruments made in this manner have had extreme wavefront deviation errors of less than 2 microns with most errors being much smaller.

Aberration correction at a magnification of 2 is made in a known manner by appropriately adjusting the lens thickness, spacing, index of refraction, and curvature radii of the components of symmetrical lens 15. This of course is done without regard to aberration correction at other values. After this initial design has been made, aberration correction automatically occurs at magnifications of 0.5 and −1.0, as mentioned previously. Thereafter, a computer is used in a known manner to determine the modifications of the parameters described above for optimizing the aberration distribution in the entire range of magnifications to be used, thereby to arrive at a family of curves such as curves 29 of FIG. 2. When these final computer adjustments are made and applied to lens 15, there may be a perceptible departure from symmetry; however, the multi-element lens 15 will remain substantially symmetrical as described above. If desired, the final computer adjustments may be made with the aid of a known lens design computer program known as Accos Zoom, which is commercially available from the Scientific Calculation Corporation.

In summary, a technique has been described for designing a lens alignment instrument capable of generating wavefronts which conform in curvature to a rather wide spectrum of lens surfaces varying from concave to convex. The adjustments of the output wavefront are made simply and conveniently by axial movement of a single converging lens. Most importantly, the instrument can be corrected for aberrations along substantially the entire range of values of wavefront curvature to increase the accuracy and precision with which lens alignments can be made.

The alignment instrument in which the invention is used of course merely illustrates one environment in which the invention may be employed. For example, since only relative movement is required, the multi-element lens 15 may be movable and the converging lens 14 fixed. Light projected through, rather than reflected from, the lens surface under study may be used for alignment observation. Various other embodiments and modifications may be made by those skilled in the art without departing from the spirit and scope of the invention.

What is claimed is:

1. An optical system for producing a wavefront having a curvature that can be varied from convex to planar to concave comprising:
    a source of substantially collimated light;
    a converging lens;
    a multi-element lens;
    means for providing relative movement between the converging lens and the mutli-element lens;
    the multi-element lens being substantially symmetrical and being corrected for aberrations at magnifications of $+n$, $1/n$ and $-1$, where $n$ is a number.

2. The optical system of claim 1, wherein:
    light from the source is projected along an optical axis through the converging lens and the multi-element lens to a holder for supporting a lens to be aligned along the optical axis, whereby lenses having surface curvatures corresponding to the wavefront curvature of light projected from the multi-element lens may be aligned by observing light reflected from or projected through it.

3. The lens system of claim 2 further comprising:
    a beam splitter located between the collimated light source and the converging lens for permitting an observer to observe light reflected from the lens mounted in the lens support, thereby to assist in lens alignment.

4. The lens system of claim 3 wherein:
    the multi-element lens is fixed; and the converging lens is axially movable.

5. A method for aligning along an optic axis lenses having any of a number of radii of curvature comprising the steps of:
    correcting a symmetrical multi-element lens for aberrations at magnifications $n$, $1/n$ and $-1$;
    placing a lens to be aligned on the optic axis of the multi-element lens;
    directing collimated light through a converging lens and a multi-element lens onto the lens to be aligned;
    adjusting the curvature of output wavefronts from the multi-element lens to match the curvature of a surface of the lens to be aligned;
    said last-mentioned step comprising the step of adjusting the axial position of the converging lens;
    observing light reflected from the lens to be aligned and adjusting its position until light reflected from it follows the optic axis.

6. The method of claim 5 further comprising the step of:
    adjusting the aberrations of the multi-element lens to make substantially the same aberrations at values of magnification between $n$ and $\infty$ and between $\infty$ and $-1$.

7. The method of claim 5 further comprising the step of:
    rotating the lens to be aligned about the optic axis during observation of light reflected therefrom.

* * * * *

UNITED STATES PATENT OFFICE
CERTIFICATE OF CORRECTION

Patent No. 3,782,829     Dated January 1, 1974

Inventor(s)  Donald R. Herriott

It is certified that error appears in the above-identified patent and that said Letters Patent are hereby corrected as shown below:

Col. 1, line 23,   delete "observtion" and insert therefor --observation--.

Col. 2, line 3,    delete "of -2 to +2" and insert therefor --of -1 to +2--.

Col. 5, line 9,    delete "mutli-element" and substitute therefor --multi-element--.

Col. 6, line 15,   after "the" (first occurrence) insert --relative--, after "lens" insert --with respect to the multi-element lens--;

line 16,   delete "reflected from" and insert --impinging on--;

line 17,   after "until" insert --such--, after "light" delete "reflected from";

line 18,   delete "it".

Signed and sealed this 4th day of June 1974.

(SEAL)
Attest:

EDWARD M. FLETCHER, JR.
Attesting Officer

C. MARSHALL DANN
Commissioner of Patents